United States Patent [19]

Kimura

[11] Patent Number: 5,003,237
[45] Date of Patent: Mar. 26, 1991

[54] METHOD OF CORRECTING AND PLAYING BACK POSITIONAL INSTRUCTION DATA IN A ROBOT

[75] Inventor: Yutaka Kimura, Aichi, Japan
[73] Assignee: Mitsubishi Jukogyo Kabushiki Kaisha, Tokyo, Japan
[21] Appl. No.: 448,757
[22] Filed: Dec. 11, 1989

[30] Foreign Application Priority Data

Dec. 14, 1988 [JP] Japan .................... 63-315621

[51] Int. Cl.$^5$ .................................. G05B 19/18
[52] U.S. Cl. ................................ 318/572; 318/570; 318/573; 364/513; 364/193
[58] Field of Search .................. 318/560–646; 364/513, 474.03, 474.06, 474.27, 474.31, 474.32, 189–192; 901/3, 42, 4, 46, 2, 47, 6, 8, 7

[56] References Cited

U.S. PATENT DOCUMENTS

| 4,362,977 | 12/1981 | Evans et al. | |
|---|---|---|---|
| 4,429,266 | 1/1984 | Tradt | |
| 4,503,493 | 3/1985 | Burkhardt et al. | 318/572 X |
| 4,541,060 | 9/1985 | Kogawa | 318/573 X |
| 4,648,024 | 3/1987 | Kato et al. | 318/570 X |
| 4,706,004 | 11/1987 | Komatsu et al. | 318/572 X |
| 4,794,540 | 12/1988 | Gutman et al. | 364/513 X |
| 4,803,640 | 2/1989 | Mitomi et al. | 364/193 X |
| 4,817,017 | 3/1989 | Kato | 364/513 |
| 4,835,710 | 5/1989 | Schnelle et al. | 364/513 |

FOREIGN PATENT DOCUMENTS 1491586 11/1977 United Kingdom .

*Primary Examiner*—Paul Ip
*Attorney, Agent, or Firm*—Toren, McGeady & Associates

[57] ABSTRACT

A method of correcting and playing back positional instruction data in a robot which performs the teaching by moving an arm or wrist axis constituting a robot body and recording its locus at intervals of a predetermined time or a predetermined moving distance corrects positional data recorded after the completion of the teaching onto a predetermined pattern such as a straight line or a circular arc and plays back the corrected positional data. Further, the method corrects the positional data onto the predetermined pattern before the beginning of the playback previously and records the corrected data.

6 Claims, 5 Drawing Sheets

METHOD OF CORRECTING AND PLAYING BACK POSITIONAL INSTRUCTION DATA IN A ROBOT

FIELD OF THE INVENTION AND RELATED ART STATEMENT

The present invention relates to a method of correcting and playing back positional instruction data in a robot of a teaching and playback system.

Methods of recording positional instruction data in a robot of a conventional teaching and playback system involves a PTP (Point To Point) method in which only positional data of several main points on a moving locus of the robot are given as the instruction data and a CP (Continuous Path) method in which a machine body of the robot including an arm and the like is directly moved by an operator and its moving locus is continuously recorded. In the latter method, when the moving locus is played back, the positional data recorded in the teaching is played back as it is and the same movement as instructed by the operator in the teaching is reproduced. With the CP method, it is suitable to cause the robot to perform a minute movement and a movement having fine variation in the velocity. On the other hand, with the PTP method, it is suitable for an operation requiring an exact locus since the positional data recorded in the teaching is interpolated and the playback operation is performed along a fixed pattern such as a straight line, a circular arc and the like.

In the playback of a program of the CP method, since the same movement as instructed by the operator in the teaching is reproduced, it is suitable to cause the robot to perform the minute movement and the movement having fine variation in the velocity. However, in order to teach the movement having a fixed pattern such as a straight line, a circular arc and the like, it is necessary for the operator to move a tool mounted on the tip of the robot along the fixed pattern exactly and maintain its posture exactly. In particular, when a target point exists in the forward direction of a spray gun as in the coating and the ceiling, the locus of the target point deviates largely from the target pattern if the posture of the spray gun is not kept exactly.

Various improvements have been made in the robot for the teaching with the CP method so that the operation force for each axis is reduced in consideration of the direct movement of the robot body by the operator. However, there is a limit in the reduction of the operation force and the operation force for each axis is varied due to friction of a transmitting portion and the weight and inertia of an arm.

Further, when the tool is moved to depict a straight line or a circular arc, a plurality of axes are always moved simultaneously. Consequently, it is difficult to move the tool exactly and maintain the posture thereof. Accordingly, in the conventional robot using the CP method, the correction operation is made one by one after the teaching by the CP method has been made once. This is a large cause that the teaching operation of the CP method which is originally simple requires much time.

On the contrary, with the PTP method, it is simple to play back the movement along the pattern such as a straight line, a circular arc and the like. However, the fine velocity feeling of the operator can not be taught and it is necessary to teach data such as a moving velocity separately, so that the teaching operation is difficult.

Further, a high speed arithmetic operation is required in order to calculate interpolation points on the pattern during the playback operation.

OBJECT AND SUMMARY OF THE INVENTION

It is an object of the present invention to solve the above problem by providing a method of correcting and playing back a positional instruction data in a robot which can be played back on a predetermined pattern exactly without correction and teaching one by one in the CP method.

The method of correcting and playing back positional instruction data in a robot according to the present invention is as follows:

(1) A robot which performs the teaching by moving an arm or wrist axis constituting a robot body and recording its locus at intervals f a predetermined time or a predetermined moving distance is characterized to correct positional data recorded after the completion of the teaching onto a predetermined pattern such as a straight line or a circular arc and play back the corrected positional data.

(2) The method of correcting and playing back positional instruction data in the robot is characterized to correct the positional data onto the predetermined pattern before the beginning of the playback previously and record the corrected data.

According to the present invention, in the robot which performs the teaching by moving a robot body including an arm and an axis of the robot and sampling its locus at intervals of a predetermined time or distance, when a movement of a predetermined pattern is taught, a signal representative of points defining the predetermined pattern is applied at the same time as the sampling, and (1) the positional data is corrected during the playback operation to play back the corrected data or (2) the positional data is corrected before the beginning of the playback to store the corrected data as the positional data, so that other points appear on the predetermined pattern defined by the points. The teaching data stored with dispersion about the predetermined pattern in the teaching in any case is corrected and played back to exist on the predetermined pattern.

DETAILED DESCRIPTION OF PREFERRED EMBODIMENTS

Figure 1:
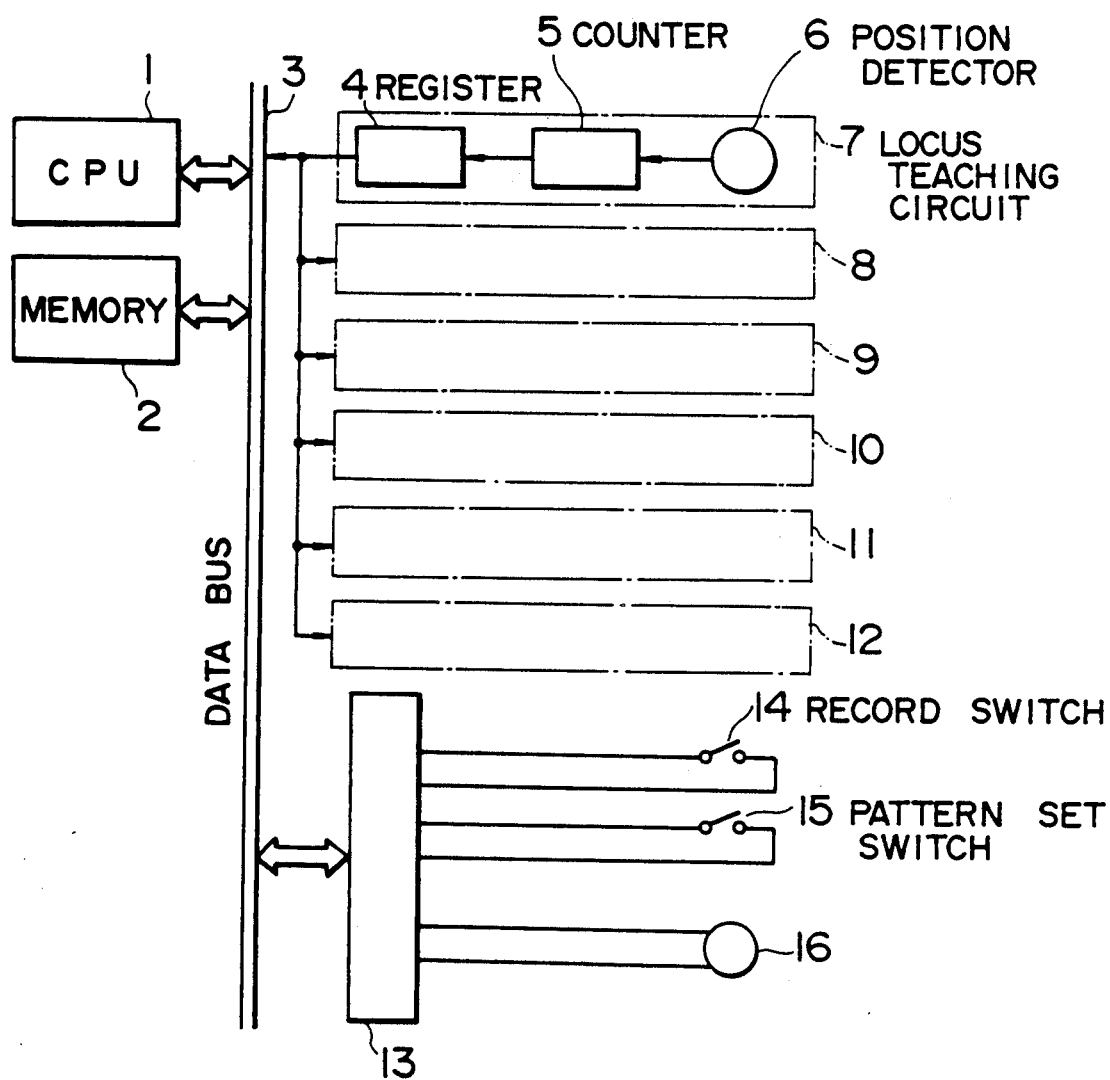
FIG. 1 is a block diagram showing a circuit configuration for teaching a locus to a robot of six axes control type according to an embodiment of the present invention.
Figure 2:
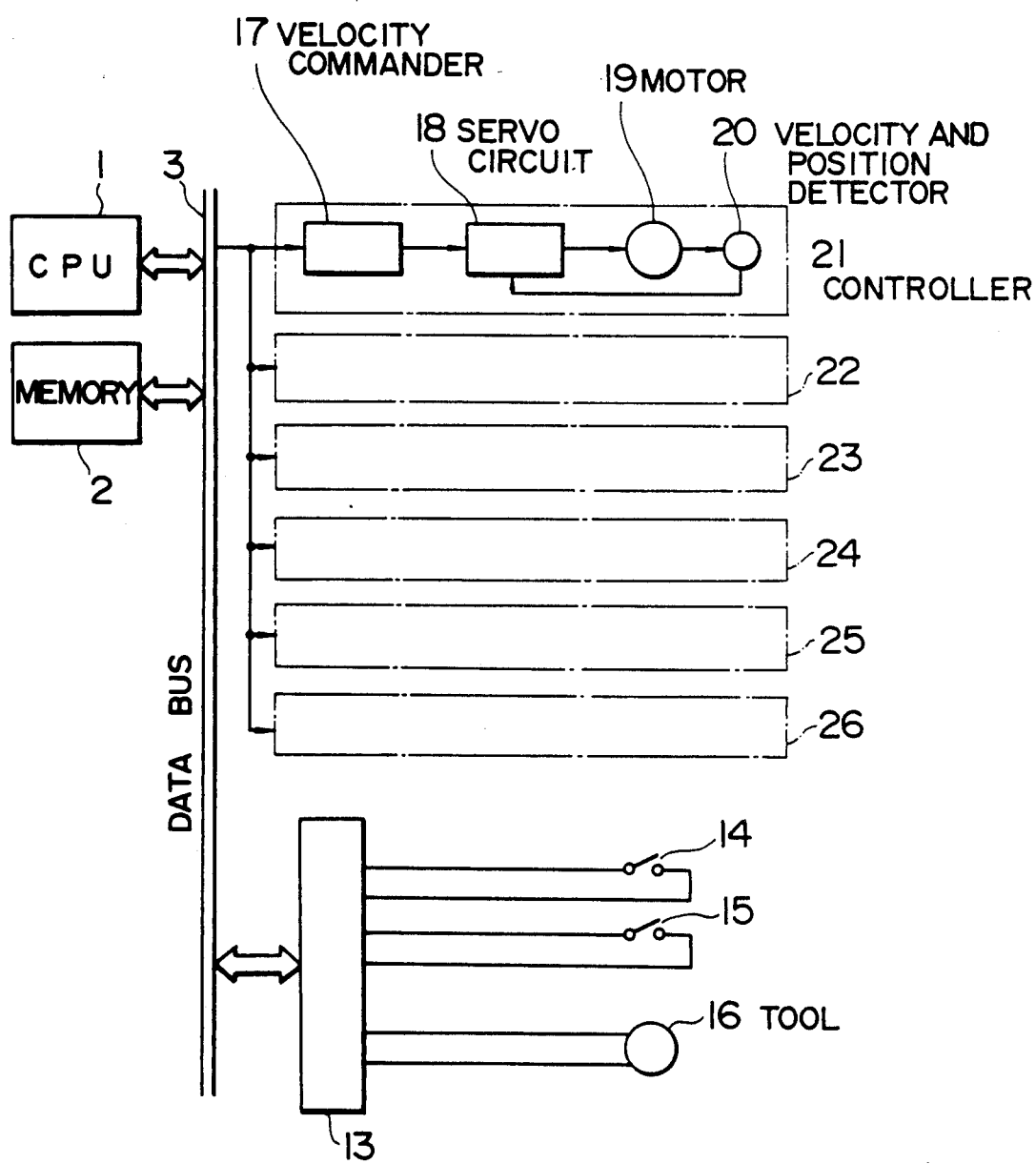
FIG. 2 is a block diagram showing a circuit configuration for driving a robot of six axes control type according to an embodiment of the present invention.

FIGS. 1 and 2 show circuit configurations for teaching a locus to a robot of six axes control type and controlling operation thereof. In FIG. 1, when an operator moves an arm or part of a machine body (not shown) of a robot to teach its locus to the robot, positional pulses are produced from a position detector 6 mounted to each axis of the robot. The pulses are counted by a counter 5 and latched by a register 4 as pulse data every recording period t of instruction data. A locus teaching circuit 7 having such function as described above is also provided in the other five axes as locus teaching circuits 8 to 12 similarly.

The pulse data latched in the register 4 is stored in a memory 2 by a central processing unit (CPU) which controls the robot when a record switch 14 which validates the recording is on. The record switch 14 is always on upon the teaching. A pattern set switch is to determine a type of a target pattern such as a straight line, a circular arc or the like. The pulse data latched in the register 4 is recorded as a positional data of the points and at the same time the status of the pattern set switch 15 is recorded as an additional data of the point. In the teaching method of the point defining the pattern, the robot is once stopped when the pattern set switch 15 is on during the teaching, and an identification data is added as a pattern definition point to the teaching data of the stopped point. More particularly, when data in the register 4 of any axis is not changed more than a predetermined decision value $\Delta L$ for movement and stop of the axis from the data stored in the memory at the last time, the robot is regarded as being in a temporarily stopped state and the identification data is added to its point. Actually, the pattern definition points are designated by circles in FIGS. 4 and 6.

FIG. 2 shows a circuit configuration for controlling operation of the robot. The CPU 1 serves to supply a velocity command to a velocity commander 17 of each axis every output period T of an operation command on the basis of the positional data stored already in the memory 2 to operate a motor 19 through a servo circuit 18 so that playback of the robot is made. Numeral 20 denotes a velocity and position detector and controllers 21 and 26 are provided for each axis, respectively. In addition, the tool 16 is controlled to be turned on and off on the basis of functional data recorded at the same time as the positional data.

In the present embodiment, description is made to the case where a straight line is used as a target line or pattern.

Figure 3:
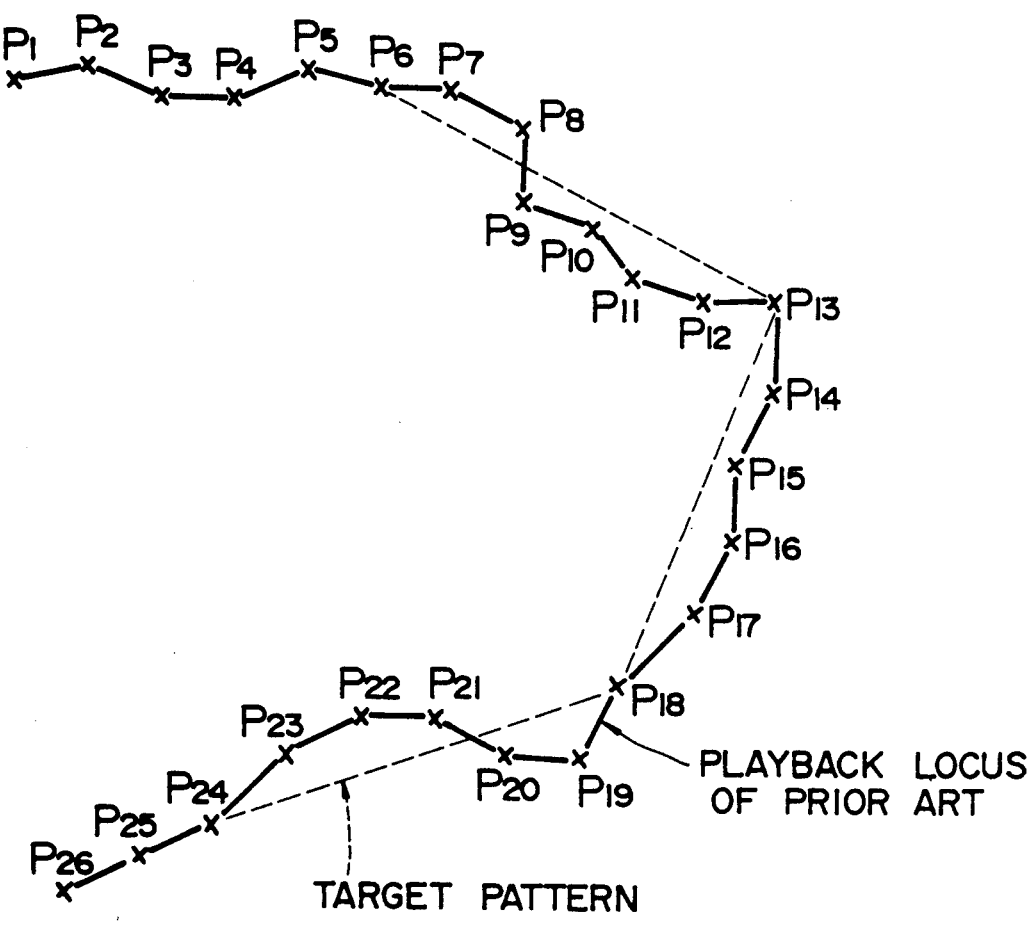
FIGS. 3 and 5 are diagrams showing positional data of a target point or a tool mounted on the tip of an arm of a robot recorded by a prior art technique and a playback locus thereof.

FIG. 3 shows an example of positional data of the tool 16 mounted on the tip of the robot arm or a target point recorded by the prior art technique. A straight line shown by broken line of FIG. 3 is a target pattern for the teaching and marks "x" show actually stored positional data. In the prior art technique, these positional data are played back as they are and accordingly, a locus shown by solid line of FIG. 3 is drawn.

Figure 4:
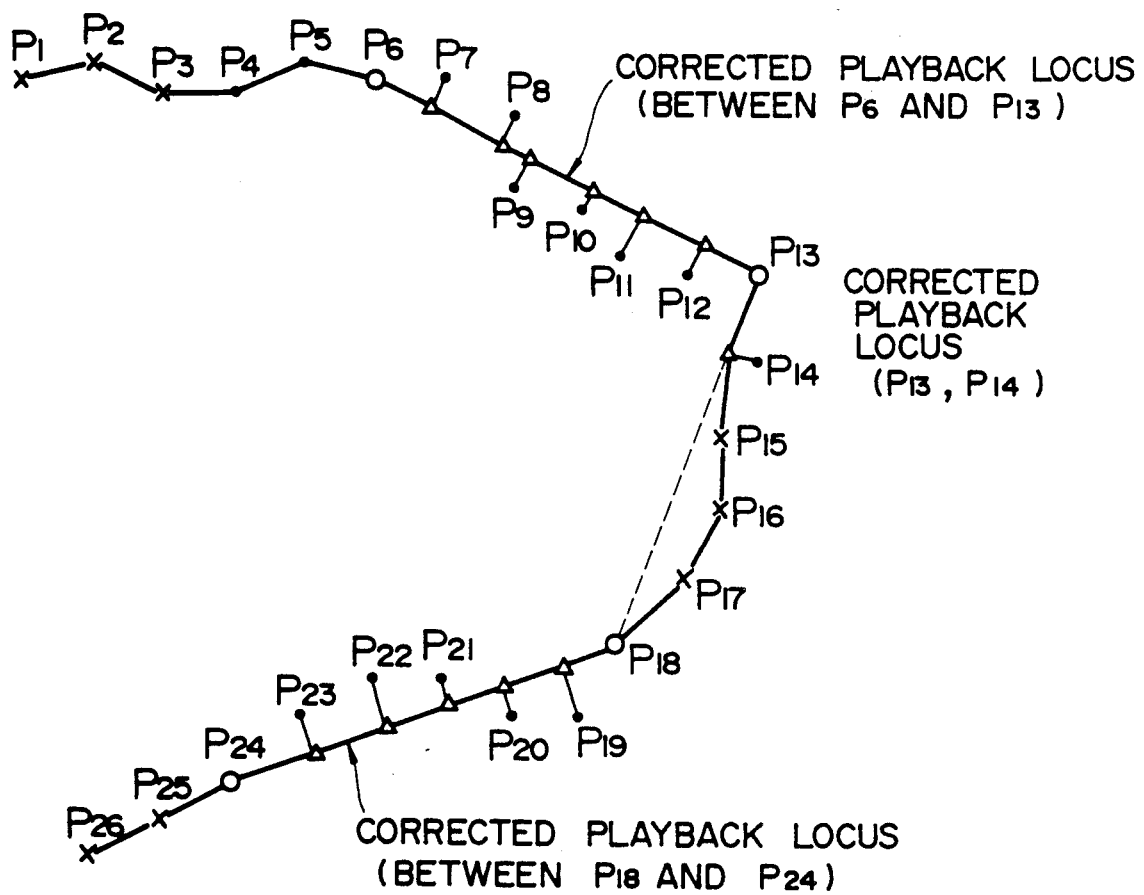
FIGS. 4 and 6 are diagrams showing statuses in which the positional data shown in FIGS. 3 and 5 are recorded by the present embodiment and the data group is corrected according to the present invention.

FIG. 4 shows the case where the teaching and playback in the present embodiment are performed for the target pattern of the straight line of FIG. 3. In FIG. 4, marks "x" represent normal points, black dots represent points in which it is recorded that these points are pattern correction points on the basis of the fact that the pattern set switch 15 is on, and circles represent points recorded as the pattern definition points in accordance with the above-mentioned method. The straight line for the target is defined by circles $P_6$, $P_{13}$, $P_{18}$ and $P_{24}$. $P_7$-$P_{12}$, $P_{14}$, $P_{19}$-$P_{23}$ positioned between the points $P_6$, $P_{13}$, $P_{18}$ and $P_{24}$ and recorded as the pattern correction points by the pattern set switch 15 are corrected to be positioned on the straight line (for example, in the case of $P_8$, straight line defined by $P_6$ and $P_{13}$) defined by the pattern definition points with circles positioned between the points $P_7$-$P_{12}$, $P_{14}$, $P_{19}$-$P_{23}$ as shown by triangle marks of FIG. 4 and are played back. Points which are not desired to be corrected onto the straight line are identified as shown by $P_{15}$ to $P_{17}$ (marked by "x") by turning off the pattern set switch 15 for the teaching. Consequently, the locus played back by the present embodiment is shown by solid line. Correction of the position onto the straight line is made by forming a perpendicular line from the pattern correction points (black dots of FIG. 4) onto the straight line and obtaining points of intersection therebetween (triangular marks of FIG. 4).

Description is now made to the case where a circular arc is used as the target pattern.

Figure 5:
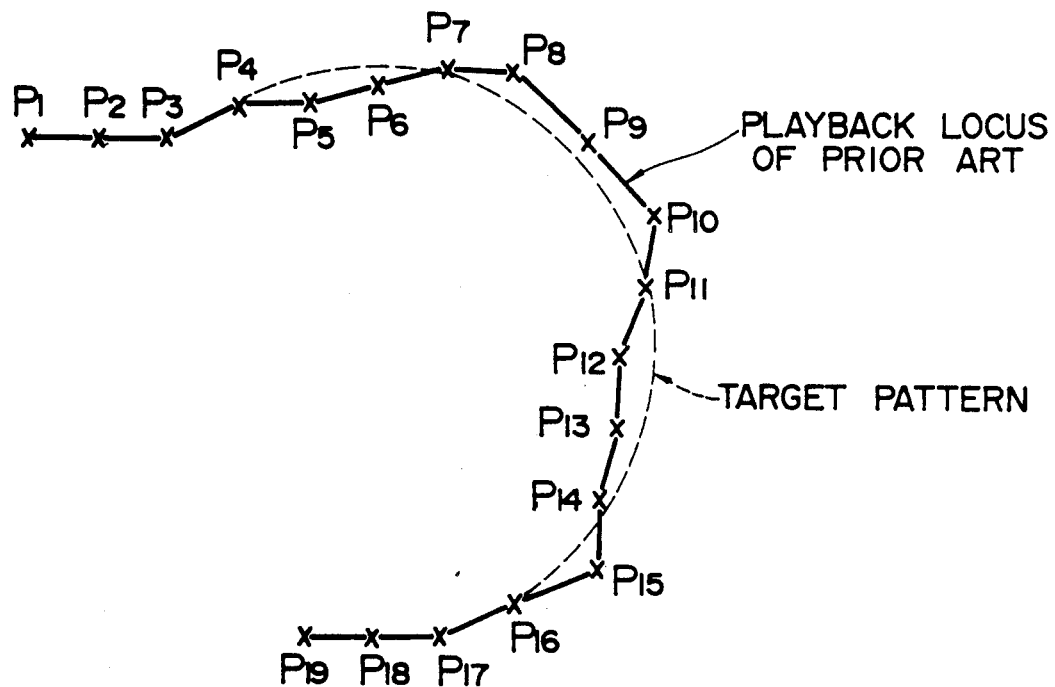

FIG. 5 shows an example of positional data of the tool 16 of the tip of the robot arm recorded by the present embodiment or target points, and the circular arc designated by broken line is taught as a target. Marks "x" show actually stored position data and a locus played back by the prior art technique is shown by solid line.

Figure 6:
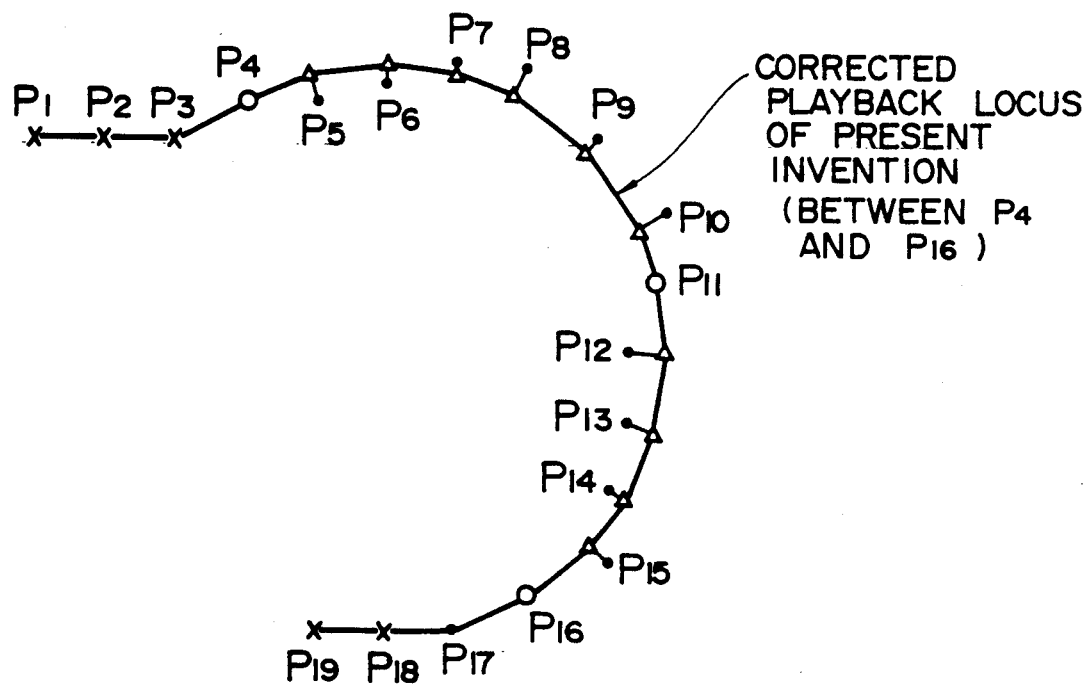

FIG. 6 shows a case where the teaching and playback have been made to the target pattern of FIG. 5 in the present embodiment. In FIG. 6, marks "x" represent normal points, black dots represent points in which it is recorded that these points are pattern correction points on the basis of the fact that the pattern set switch 15 is on, and circles represent points recorded as the pattern definition points in accordance with the above-mentioned method. The circular arc of the target is defined by points $P_4$, $P_{11}$ and $P_{16}$ marked by circle and the point $P_4$ is a beginning end of the circular arc while the point $P_{16}$ is a termination end thereof. Points $P_5$-$P_{10}$ and $P_{12}$-$P_{15}$ positioned between the points $P_4$ and $P_{16}$ and recorded as the pattern correction points by the pattern set switch 15 are corrected onto the circular arc as shown by triangular marks of FIG. 6 and are played back. A point $P_{17}$ of FIG. 6 is not corrected since it is not positioned between the beginning point and the termination point of the circular arc even if it is recorded as the pattern correction point marked by black dot. Thus, the locus played back by the present embodiment is drawn onto the circular arc of the target as shown by the solid line. The position correction onto the circular arc is made by forming a perpendicular line from the pattern correction points (black dots of FIG. 6) onto the circular arc and obtaining points of intersection therebetween (triangular marks of FIG. 6).

There are two methods of correcting the positional data as described above, as follows:

(1) The positional data is played back while being calculated in real time during the playback operation but the memory data is not corrected (rewritten).

(2) After completion of the teaching, only the data correction is made by a data correction operation switch (not shown) to rewrite the memory data and only the playback of data rewritten in the playback operation is made. Either method can be implemented.

In the embodiments, means for adding the identification data as the pattern definition points (circles) in the teaching has been described under the condition of turning on the pattern set switch and the temporarily stop, while alternatively operation of another dedicated switch not shown may be used.

According to the present invention, when the playback is made after correction of the positional data, a locus conformed exactly to the pattern such as a straight line is obtained while the simple teaching method of the CP method and the feature in the playback are utilized. Further, since the controller which does not include the data correction method does not require the high-speed arithmetic operation, the robot which can perform good operation without increased cost can be obtained.

I claim:

1. A method of correcting and playing back positional instruction data in a robot having a machine body comprising an arm or wrist axis which is first moved during a teaching mode to record a locus of points thereof at intervals of a predetermined time or of a predetermined moving distance and thereafter the recorded locus is played back to control a movement of the arm or wrist axis of the robot, the improvement comprising the steps of:

(a) establishing a selected target pattern;
   (b) generating a signal for determining whether or not a positional signal generated during the teaching mode is data for determining the selected target pattern by setting a pattern set switch;
   (c) recording a positional signal from a position detector mounted to each axis of the robot during the teaching mode, said target pattern determining positional signal being generated for less than the total number of positional signals generated during the teaching mode;
   (d) preparing positional signal data corrected by data correction means in response to the signals generated during step (b) so that the positional signal data to be corrected, recorded during step (c), becomes a point on the target pattern; and
   (e) playing back the positional signal data which is not corrected and the positional signal data which is corrected by the data correction means to control the robot's movements.

2. The method of claim 1, wherein the selected target pattern consists of an arc of a circle or a straight line.

3. The method of claim 2, wherein step (d) is carried out by adjusting the recorded positional values of step (c) by following a perpendicular line to the selected target pattern.

4. A method of correcting and playing back positional instruction data in a robot having a machine body comprising an arm or wrist axis which is moved along a path from a beginning to a termination point during a teaching mode to record a locus of points thereof at intervals of a predetermined time or of a predetermined moving distance and thereafter the recorded locus is played back to control a movement of the arm or wrist axis of the robot, the improvement comprising the steps of:

(a) establishing a selected target pattern consisting of circle arcs or straight lines on the basis of the positional data;
   (b) generating a signal for determining whether or not a positional signal generated during the teaching mode is data for determining the selected target pattern by setting a pattern set switch;
   (d) preparing positional signal data corrected by data correction means in response to the signals generated during step (b) so that the positional signal data to be corrected, latched during step (c), becomes a point on the target pattern; and
   (e) recording and playing back both positional signal data which is not corrected and positional signal data which is corrected by the data correction means to control the robot's movements.

5. The method of claim 4, wherein the selected target pattern extends only over part of the robot path from the beginning to the termination point.

6. The method of claim 5, wherein step (d) is carried out by adjusting the latched positional values of step (c) by following a perpendicular line to the selected target pattern.

* * * * *